US009400207B2

(12) United States Patent
Johnson

(10) Patent No.: US 9,400,207 B2
(45) Date of Patent: Jul. 26, 2016

(54) SENSOR MOUNTING BRACKET

(71) Applicant: ILLINOIS TOOL WORKS INC., Glenview, IL (US)

(72) Inventor: Thomas H. Johnson, Winnebago, MN (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 146 days.

(21) Appl. No.: 13/840,891

(22) Filed: Mar. 15, 2013

(65) Prior Publication Data

US 2014/0262556 A1 Sep. 18, 2014

(51) Int. Cl.
| | |
|---|---|
| G01G 23/02 | (2006.01) |
| G01G 21/08 | (2006.01) |
| G01G 23/00 | (2006.01) |
| G01G 3/14 | (2006.01) |
| G01G 3/16 | (2006.01) |
| G01G 21/23 | (2006.01) |

(52) U.S. Cl.
CPC .............. *G01G 21/08* (2013.01); *G01G 3/1414* (2013.01); *G01G 3/165* (2013.01); *G01G 21/23* (2013.01); *G01G 23/002* (2013.01)

(58) Field of Classification Search
CPC ...... Y10S 177/09; F16M 13/02; G01G 21/00; G01G 23/005; G01G 3/1414; G01G 23/002; G01D 11/305; G01D 11/30; G01D 11/245
USPC .................. 248/201, 309.1, 205.1; 73/866.5; 177/238–244, DIG. 9
See application file for complete search history.

(56) References Cited

U.S. PATENT DOCUMENTS

| | | | |
|---|---|---|---|
| 4,065,962 A | 1/1978 | Shoberg | |
| 4,143,727 A | 3/1979 | Jacobson | |
| 4,254,841 A | 3/1981 | Loskill | |
| 4,280,576 A | 7/1981 | Smith, Jr. | |
| 4,438,823 A | 3/1984 | Hussels et al. | |
| 4,463,614 A | 8/1984 | Lee | |
| 4,611,677 A | 9/1986 | Yu | |
| 4,971,177 A * | 11/1990 | Nojiri et al. | 186/61 |
| 4,986,376 A * | 1/1991 | Cone | 177/128 |
| 5,072,799 A * | 12/1991 | Freeman et al. | 177/154 |
| 5,111,896 A * | 5/1992 | Porcari et al. | 177/16 |
| 5,199,518 A * | 4/1993 | Woodle | 177/211 |
| 5,205,369 A * | 4/1993 | Neeleman | 177/229 |
| 5,250,762 A * | 10/1993 | Gustafsson et al. | 177/244 |
| 5,269,388 A | 12/1993 | Reichow et al. | |
| 5,319,161 A | 6/1994 | Miller et al. | |

(Continued)

FOREIGN PATENT DOCUMENTS

| | | | | |
|---|---|---|---|---|
| EP | 1070945 A1 | | 1/2001 | |
| JP | 2008-039585 | * | 2/2008 | .............. G01L 19/14 |

OTHER PUBLICATIONS

ISR and WO for PCTUS2014/019998 mailed May 30, 2014.

*Primary Examiner* — Randy W. Gibson
(74) *Attorney, Agent, or Firm* — Hauptman Ham, LLP

(57) ABSTRACT

The invention relates to a symmetrical sensor mounting bracket assembly comprising a first sensor mounting bracket and a second sensor mounting bracket combined together, one above the other in parallel orientation; at least one sensor attachment fixture configured to facilitate attachment of the bracket to a sensor mounting fixture and at least one mounting element configured to facilitate attachment of the bracket to a load bearing plate or a sensor support structure.

37 Claims, 3 Drawing Sheets

(56) References Cited

U.S. PATENT DOCUMENTS

| | | | |
|---|---|---|---|
| 5,419,210 A | 5/1995 | Haker | |
| 5,442,146 A | 8/1995 | Bell et al. | |
| 5,459,289 A * | 10/1995 | Burkhard | 177/244 |
| 5,600,104 A * | 2/1997 | McCauley et al. | 177/136 |
| 5,604,336 A * | 2/1997 | Johnson | 177/229 |
| 5,747,747 A * | 5/1998 | Cadou et al. | 177/145 |
| 6,362,439 B1 * | 3/2002 | Reichow | 177/144 |
| 6,555,765 B2 * | 4/2003 | Paine | 177/142 |
| 6,573,462 B1 * | 6/2003 | Shymko | 177/149 |
| 6,693,244 B2 | 2/2004 | Johnson et al. | |
| 6,787,714 B2 * | 9/2004 | Iiduka | 177/212 |
| 7,038,146 B2 * | 5/2006 | Saito et al. | 177/136 |
| 7,040,178 B1 | 5/2006 | Perkins | |
| 7,220,924 B2 * | 5/2007 | Burkhard | 177/229 |
| 7,365,276 B2 * | 4/2008 | Burkhard | 177/229 |
| 7,373,846 B2 * | 5/2008 | Furukawa et al. | 73/862.621 |
| 7,694,589 B2 | 4/2010 | Mehus et al. | |
| 7,836,997 B2 * | 11/2010 | Takayasu et al. | 180/273 |
| 7,954,668 B2 | 6/2011 | Mehus et al. | |
| 9,046,408 B2 * | 6/2015 | Chan | |
| 2005/0081650 A1 * | 4/2005 | Bucher et al. | 73/862.623 |
| 2006/0169063 A1 * | 8/2006 | Loher et al. | 73/862.626 |
| 2014/0262555 A1 * | 9/2014 | Johnson | 177/154 |

* cited by examiner

SENSOR MOUNTING BRACKET

BACKGROUND OF THE INVENTION

1. Field of the Invention

The present invention relates to a sensor mounting bracket, in particular a symmetrical sensor mounting bracket for a load cell. The present invention also relates to a symmetrical mounting bracket for a sensor comprising a symmetrical mounting arrangement capable of loading effect and mounting effect amelioration. The invention further relates to a weigh scale system comprising a symmetrical sensor mounting bracket and a sensor comprising a symmetrical mounting arrangement.

2. Description of Related Art

Typically sensors such as load cells are mounted to a support structure in a weigh scale system or to a reinforced part directly attached to it in an installation. The sensor is attached in at least two places when it is a load cell for sensing force. A loading fixture is mounted directly to the load cell at another location on it. Typically, the load cell is mounted to the support structure at its bottom or to one or more of its sides at one end of the load cell in a scale system. The loading fixture is mounted at the top or to one or more sides of the opposite end of the load cell. The load cell, and hence the sensor, is made stiff at these ends to reduce distortion from so-called loading and mounting effects.

BRIEF SUMMARY OF THE INVENTION

A sensor is subject to "shear" when subjected to load changes such as is the case when loading the loading fixture of the sensor. This results in the so-called "loading effect". Shear results from the spring-like behaviour of sensor and the necessity of the sensor to deform in order to measure an applied load. As such, a sensor of finite stiffness must have spring-like behaviour, exhibiting deflection based on spring constants. A distorted data pattern can be the result of uncorrelated shear caused by forces other than the distorted load, leading to inaccuracies in measurement data from the sensor. Previous attempts to control the loading effect have involved stiffening to reduce the uncorrelated shear of the sensor. Although performance is enhanced by the presence of stiffening, the solution involves increased material in the weigh scale and an increase in the cost of manufacture.

The so-called "mounting effect" can be seen as a result of mounting the sensor on the adjacent support structure and/or of mounting the loading fixture on the sensor.

Fasteners, for example bolts, attaching the sensor to the attachments distort the sensor and cause output changes that are undetermined and that change with changes in load and temperature and even time and usage.

These loading and mounting effects can be partially compensated for when the sensor is calibrated to make the sensor as accurate as possible in that configuration. However, the compensation is limited to lower accuracy sensors with poorer resolution, since these effects are undetermined and caused by unstable frictional joints that can change.

The loading and mounting effects are only reduced by using stiffening members and through calibration of the scale system incorporating the sensor. As a result, the performance of the sensor is compromised. Particularly, for sensors wherein a lower resolution and accuracy is required, for example when between 500 to 10,000 unit divisions is required, controlling the stiffness of the sensors at attachment areas may be deemed to be adequate. However, the desire to have higher resolution and accuracy, for example when between 25,000 and 100,000 unit divisions is required, as is the case for example in part counters and pharmaceutical scales, requires an improved solution than the reduction of the loading and mounting effects seen as a result of controlling the stiffness of the sensor at attachment areas.

Furthermore, distortion from loading and temperature in the support structure at the fixed portion of the sensor may be different than that in the loading fixture at the live portion for sensors and not enable improved symmetry in bending of the end blocks. As a result, scale systems require calibration after assembly to be accurate.

It is an aim of the present invention to overcome one or more of the above drawbacks associated with the prior art.

It is a further aim of the present invention to provide an improved mounting bracket which reduces the loading and mounting effects associated with the mounting of sensors, in particular load cell sensors.

In a first aspect, the present invention provides a symmetrical sensor mounting bracket assembly comprising a first sensor mounting bracket and a second sensor mounting bracket combined together, one above the other in parallel orientation; at least one sensor attachment fixture configured to facilitate attachment of the bracket to a sensor mounting fixture and at least one mounting element configured to facilitate attachment of the bracket to a load bearing plate or a sensor support structure; and a displacement control assembly adapted to limit the deflection of a sensor coupled to the bracket assembly.

By means of the present invention, a sensor mounted on the sensor mounting bracket assembly according to the invention will be secured in the direction of sensor sensitivity but provide flexibility in the plane perpendicular to the direction of sensitivity. As a result, the sensor will be isolated in such a way that output is not affected as much by distortion or stress in the mounting or loading fixtures.

This is especially advantageous where the sensor is a load cell.

Preferably, each bracket comprises a base portion and at least one side wall upstanding from the edge of the base portion.

In exemplary embodiments, the at least one sensor attachment fixture is located on the base portion.

In exemplary embodiments, the at least one mounting element extends outwardly from a side wall.

In exemplary embodiments, the displacement control assembly comprises a first control member adapted to limit the divergence of the first and second brackets relative to one another when under a load.

In exemplary embodiments, the first control member is in the form of an attachment fastener. The attachment fastener may be a bolt, screw or the like.

Preferably the first and second brackets each comprise an aperture having a threaded bore for receiving the first control member.

Preferably the displacement control assembly further comprises a second control member adapted to limit the convergence of the first and second brackets relative to one another when under a load.

In exemplary embodiments, the second control member comprises a stopper. The stopper may be any suitable form capable of limiting the convergence of the first and second brackets relative to one another when under load. For example, the stopper may be in the form of a threaded cylindrical pin.

Preferably the first and second brackets each comprise an aperture having a threaded bore for receiving the second control member.

It is preferred that the footprint of the sensor mounting bracket to which a sensor is to be attached is substantially equivalent to the footprint of the sensor. In preferred arrangements, the sensor mounting bracket to which a sensor is to be attached is of rectangular footprint.

In certain embodiments, the first sensor mounting bracket comprises a rectangular base portion and four side walls each upstanding from an edge of the rectangular base portion.

In certain embodiments, the base portion is formed of two base sections. The first base section is a plate; the second base section is formed of an aperture. More specifically, one half of the base portion forms the first base section and is located between the transverse midline of the first bracket and the side wall at one end of the first bracket. The other half of the base portion forms the second base section and is located between the transverse midline of the first bracket and the side wall at the other end of the first bracket.

The first base section may be recessed below the plane including the lower surfaces of each of the side walls of the first bracket. More specifically, the first base section may be frustopyramidal. More specifically, the first base section is a plate formed in the shape of a pyramid with four sides and having the upper portion of the pyramid cut off by a plane parallel to the base. The cut off plane is the lowermost portion of the first base section.

In embodiments, the first bracket comprises a plurality of sensor attachment fixtures. In preferred embodiments, the first bracket comprises a number of sensor attachment fixtures, for example the first bracket may comprise one, two, three, four etc. sensor attachment fixtures.

It is much preferred that the attachment fixtures are positioned on the first base section. In embodiments, the sensor attachment fixtures are located on the lowermost planar portion of the first base section.

In embodiments of the invention, the sensor mounting bracket assembly comprises at least one mounting element configured to facilitate attachment of the bracket assembly to a load bearing member or a sensor support structure.

In preferred embodiments, the sensor mounting bracket assembly comprises a plurality of mounting elements.

Preferably, at least one of the plurality of mounting elements is located on the first mounting bracket.

Preferably, at least one of the plurality of mounting elements is located on the second mounting bracket.

In exemplary embodiments, the, or each, mounting element extends outwardly from the, or each, side wall of the bracket.

In embodiments wherein the first bracket has a rectangular footprint, it is preferred that the first bracket comprises three mounting elements. More specifically, the rectangular first bracket, comprising four side walls comprises three mounting elements extending outwardly from three side walls of the first bracket. Preferably two of the mounting elements, extend outwardly from opposing side walls and the third mounting element extends outwardly of the side wall located at the end of the bracket adjacent the second base section. In such embodiments, it is much preferred that the first bracket is longitudinally symmetrical about a central longitudinal axis of the first bracket.

In embodiments, the, or each, mounting element comprises an aperture. More specifically, the, or each, mounting element comprises an aperture having a threaded bore.

The, or each, mounting element is configured to receive an attachment fastener.

The, or each, attachment fastener may be a bolt, rivet, weld, adhesive or the like.

In certain embodiments, the, or each, mounting element may comprise a flexible decoupling element. The, or each, flexible decoupling element is/are operable to further reduce mounting stresses when the first sensor mounting bracket is mounted to a load bearing plate or a load cell support structure. Such flexible decoupling elements are particularly advantageous when the first sensor mounting bracket is to be attached to a sensor for use in a weigh scale requiring an extremely accurate measurement of load.

Preferably the symmetrical sensor mounting bracket assembly of the first aspect is attachable to a sensor in the form of a load cell. Preferably the load cell is symmetrical about a central vertical axis.

The sensor is preferably attached to the first sensor mounting bracket of the sensor mounting bracket assembly by a coupling element. The coupling element may be attached to or through the, or each, sensor attachment fixture of the first bracket and to or through a sensor mounting fixture of a sensor.

More specifically the coupling element may be one or more of a bolt, rivet, weld, adhesive or the like.

In preferred embodiments, the coupling element comprises a plurality of bolts.

Each bolt may be a threaded bolt securable to the sensor by a nut. More specifically the threaded bolt is securable to the sensor by a nut and locked into position by a further locking nut.

Preferably the symmetrical sensor mounting bracket assembly is formed by combining two identical sensor mounting brackets. That is to say that the second mounting bracket is identical to the first mounting bracket.

The first and second sensor mounting brackets are combined together such that the second base section of the second sensor mounting bracket overlies the first base section of the first sensor mounting bracket and the first base section of the second sensor mounting bracket overlies the second base section of a first sensor mounting bracket. The sensor mounting bracket assembly is longitudinally symmetrical about the central longitudinal axis of the assembly.

In this way, a symmetrical sensor mounting bracket assembly is attachable to a symmetrical sensor by coupling elements attached to or through the, or each, sensor attachment fixture of each bracket and to or through each sensor mounting fixture of the sensor.

It is preferred that the symmetrical sensor mounting bracket assembly is coupled to a sensor symmetrical about a central vertical axis comprising first and second mounting surfaces on the same horizontal plane.

By providing a symmetrical sensor mounting bracket assembly attached to a symmetrical sensor, various advantages are realised. For example, the sensor output is not affected by the mounting arrangement. The mounting effects are cancelled out by using symmetry of the sensor and in the first mounting bracket so that the load cell performance is greatly unaffected by the mounting. An accuracy of between 5,000 to 25,000 divisions before calibration is readily achievable. When utilized with a symmetrical sensor, the invention provides a sensor arrangement both in function and in its mounting wherein cancellation of the so-called mounting effect is nearly complete to the tolerances of production processes and not limited by the material characteristics.

According to a second aspect of the present invention there is provided a sensor assembly comprising a sensor symmetrical about a central vertical axis and comprising first and second mounting surfaces each on the same horizontal plane; and a plurality of sensor mounting brackets coupled to the sensor at the first and second mounting surfaces, wherein the sensor mounting brackets are configured for attachment to a support structure and to a loading fixture.

In preferred embodiments, the sensor assembly of the second aspect comprises a symmetrical sensor mounting bracket assembly according to the first aspect.

Features of one or more embodiments of the first and second aspects may be combined with one or more features of one or more other embodiments of the first and second aspects.

According to a third aspect of the present invention, there is provided a weigh scale comprising a sensor coupled to sensor mounting bracket assembly according to the first aspect of the invention and further comprising a load bearing member coupled to the mounting elements of the first and second sensor mounting brackets.

The weigh scale may be a bench scale.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

BRIEF DESCRIPTION OF THE SEVERAL VIEWS OF THE DRAWINGS

Embodiments of the present invention will now be described, by way of example only, with reference to the accompanying drawings in which.

DETAILED DESCRIPTION OF SOME EXEMPLARY EMBODIMENTS OF THE INVENTION

Figure 1:
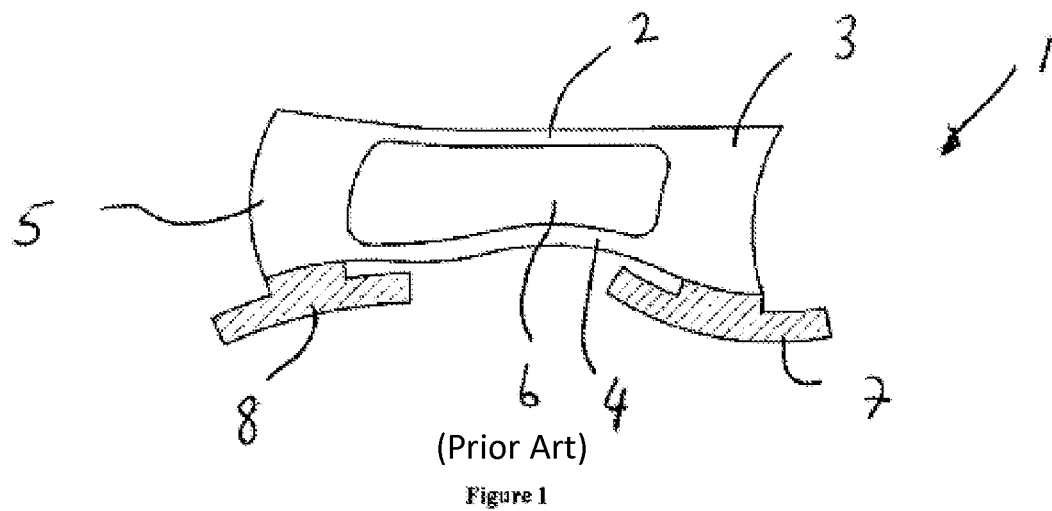
FIG. 1 depicts a sensor mounted to a loading fixture and a support structure, and the resultant transfer of mounting distortion to the sensor.

While the invention is susceptible to various modifications and alternative forms, specific embodiments thereof are shown by way of example in the drawings and will herein be described in detail. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

Further, although the invention will be described in terms of specific embodiments, it will be understood that various elements of the specific embodiments of the invention will be applicable to all embodiments disclosed herein.

In the drawings, similar features are denoted by the same reference signs throughout.

Referring to FIG. 1 there is depicted a side view of a sensor 1 mounted to a loading fixture 7 and a support structure 8. The sensor shown is in the form of a load cell 1. The load cell 1 is formed of a substantially rectangular block of material comprising first and second loading members 3, 5 joined together by flexure elements 2, 4. As known in the art, each flexure element can have a strain responsive element, such as a strain gauge, mounted thereon and configured to respond to the forces acting on the flexure elements of the load cell 1 when a load is applied thereto.

The load cell 1 comprises up to four apertures 6 (only one shown) in the material of the load cell 1 which are profiled and arranged such that the load cell 1 is capable of resolving and measuring shear forces and bending moments resulting from the application of a load thereto.

The load cell 1 comprises mounting fixtures (not shown) located at each end thereof for coupling the load cell 1 to a loading fixture 7 and a support structure 8. The mounting fixtures provide a mounting surface at each end of the load cell 1 onto which the loading fixture 7 and the support structure 8 may be mounted. The mounting surfaces provide a horizontal surface onto which the loading fixture 7 and the support structure 8 may be mounted.

Attachment fixtures (not shown) in the form of threaded bolts are provided to attach the loading fixture 7 and the support structure 8 to the load cell 1 at the mounting fixtures.

In load cells known in the art, mounting surfaces are parallel to each other and with each mounting surface located on an opposing surface of the load cell at the opposite end to the mounting surface. As a result, an asymmetric load cell is provided wherein asymmetry is in the positioning of the mounting surfaces relative to one another and the subsequent location of the loading fixture and the support structure when attached to the mounting fixtures.

However, direct mounting of the load cell to the loading fixture and the support structure may still result in the transfer of mounting distortion to the load cell.

This is because attachment fixtures distort the end locations and cause output changes that are undetermined and that change with load and temperature and even time and usage. The transfer of the mounting distortion in such an arrangement is shown in FIG. 1.

The symmetrical sensor mounting bracket assembly according to the invention comprises a first sensor mounting bracket 10a and a second sensor mounting bracket 10b combined together, one above the other in parallel orientation. The sensor mounting bracket further comprises a displacement control assembly adapted to limit the deflection of a sensor coupled to the bracket assembly.

Figure 2:
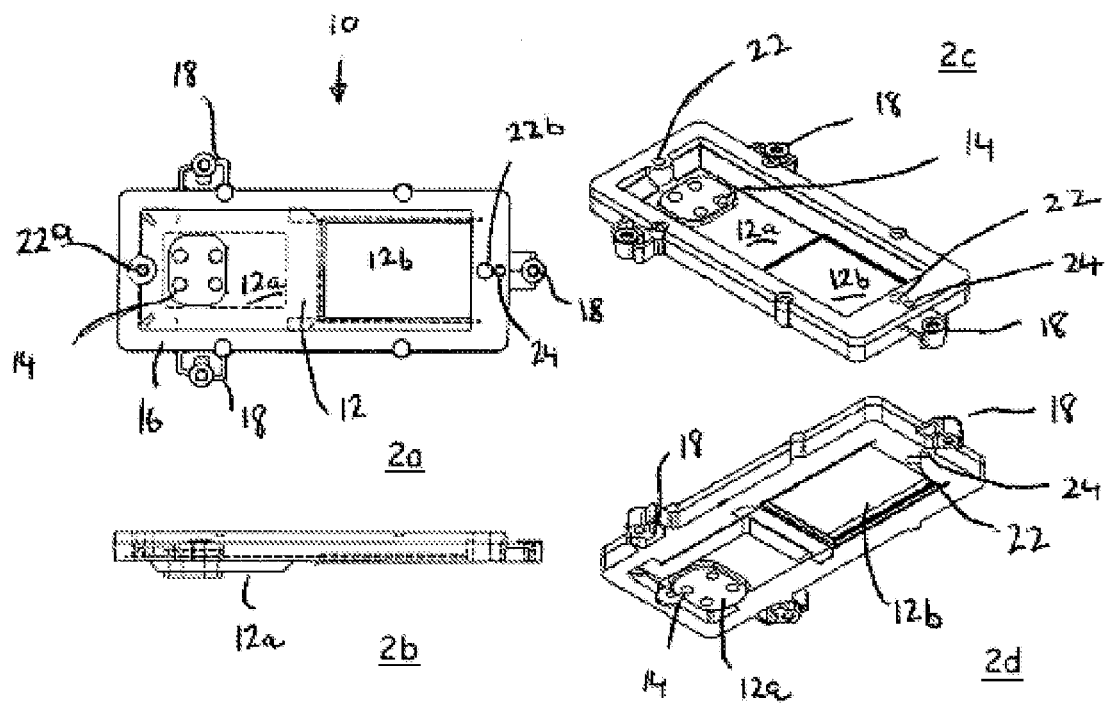
FIGS. 2a, 2b, 2c, 2d show an embodiment of a sensor mounting bracket forming part of a sensor mounting bracket assembly according to an embodiment of the first aspect of the invention.

Referring to FIGS. 2a to 2d, an embodiment of a sensor mounting bracket 10 forming part of a sensor mounting bracket assembly according to the first aspect of the present invention is shown. The bracket 10 is configured for attachment to a sensor, particularly a load cell. Referring initially to FIG. 2a, bracket 10 comprises a base portion 12 formed of a first base section 12a and a second base section 12b. The first base section 12a is frustopyramidal in shape and comprises apertures 14 for receiving fasteners such as bolts or the like. In the embodiment shown, the first base section 12a comprises four apertures 14. It would be understood that the first base section 12a may comprise any suitable number of apertures, for example one, two, three, six etc. Apertures 14 provide the sensor attachment fixtures of the bracket 10. The second base section 12b is formed of an aperture. Upstanding from the edges of base portion 12 are four side walls 16. Side walls 16 have a box-section.

Mounting elements 18 depend from three of the side walls 16 of bracket 10. The mounting elements 18 have a central aperture for receiving attachment fasteners (not shown). The attachment fasteners provide an attachment of a support structure and/or a loading fixture to the bracket 10. The mounting elements project outwardly from the side walls 16 from which they extend and are arranged such that the bracket is longitudinally symmetrical about a central longitudinal axis 20 of the bracket 10.

The bracket 10 comprises apertures 22 in the side walls 16 configured to receive coupling elements (not shown). In the embodiment shown, the bracket 10 comprises a first aperture 22a having a threaded bore on the side wall 16 without a mounting element 18 and a second aperture 22b on the opposing side wall 16. The second aperture 22b may comprise a threaded bore depending on the form of the coupling element utilized for limiting movement between the first and second brackets to each other.

The bracket 10 further comprises an aperture 24 in the form of a threaded bore in a side wall 16. In the embodiment shown, the aperture 24 is located on the same side wall 16 as the second aperture 22b and may be positioned between the second aperture 22b and the mounting element 18 depending from the side wall 16.

Figure 3:
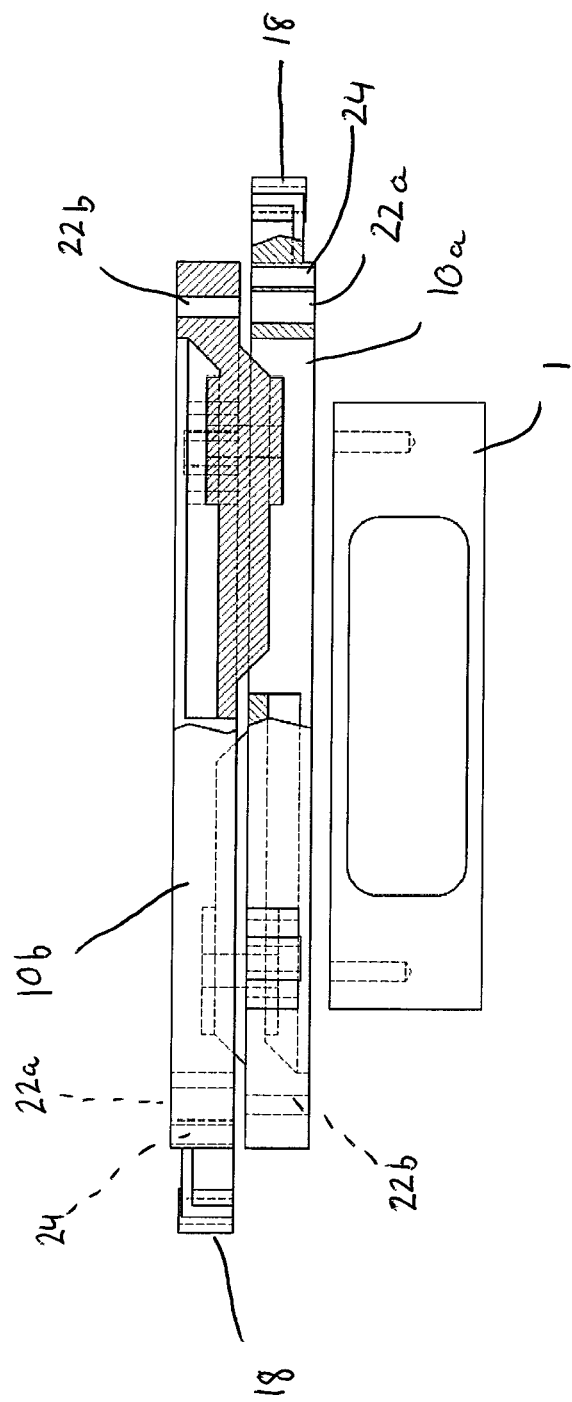
FIG. 3 depicts a sensor mounting bracket assembly according to an embodiment according to the first aspect of the invention.

Referring to FIG. 3, arrangement of the first and second mounting brackets 10a, 10b to form a sensor mounting bracket assembly according to the first aspect of the invention is shown. In the embodiment shown, the sensor mounting bracket assembly is formed by combining a first mounting bracket 10a with an identical second mounting bracket 10b. The first and second mounting brackets are in accordance with the mounting bracket 10 previously described. Displacement control members (not shown) are then inserted into apertures 22 to restrict movement between the brackets 10a, 10b in position relative to one another with a gap between them. In such an assembly, the second attachment mounting 10b is aligned on top of the first mounting bracket 10a such that the first base section 12a of the second mounting bracket 10b is located in the second base section 12b of the first mounting bracket 10a. The first and second brackets 10a, 10b are combined together in parallel relation one above the other in such an assembly.

Figure 4:
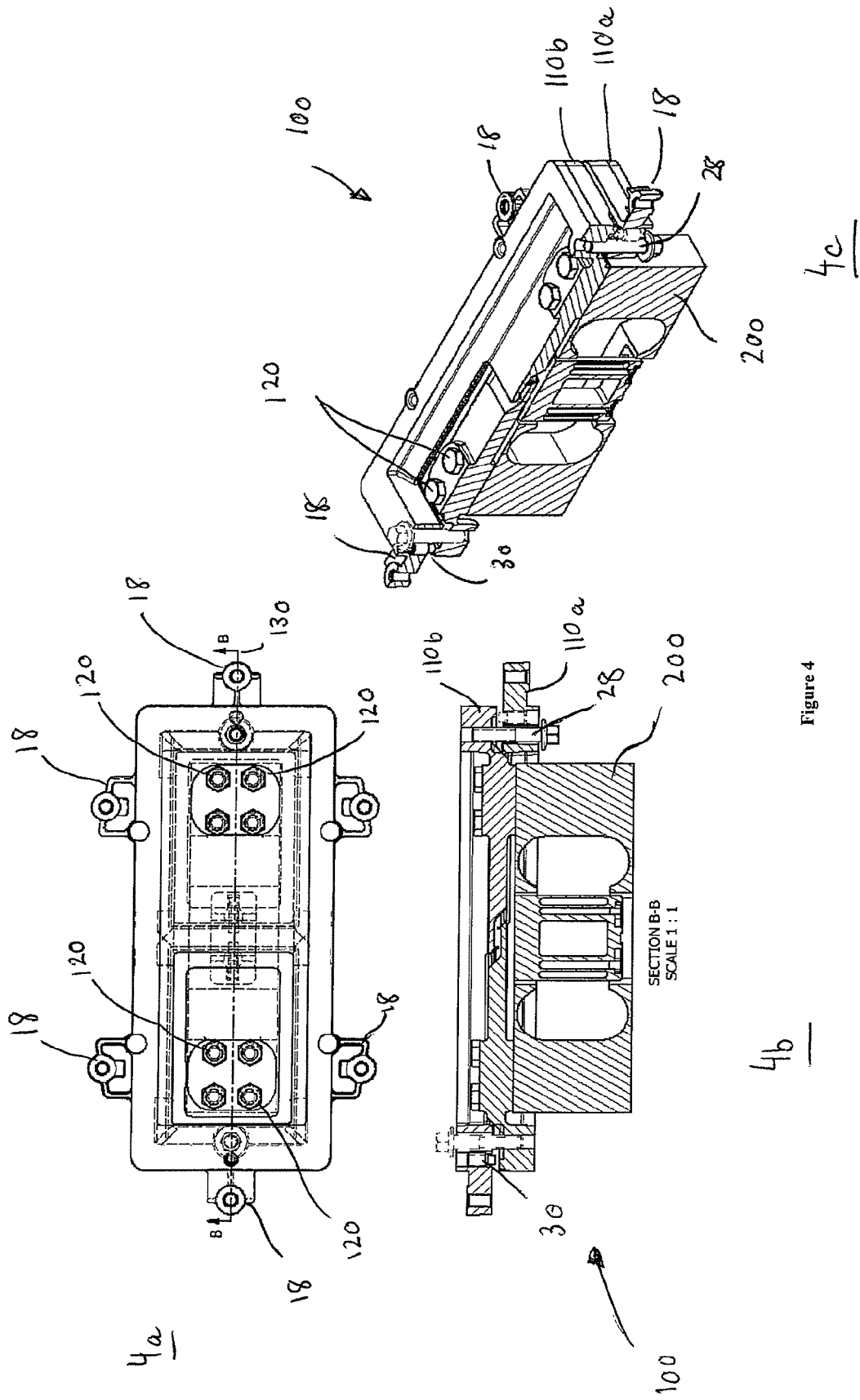
FIGS. 4a, 4b, 4c, show a sensor assembly according to an embodiment of the second aspect of the invention comprising a sensor mounting bracket assembly according to an embodiment of the first aspect of the invention.

FIGS. 4a to 4c depict a sensor assembly 100 according to an embodiment of the second aspect of the invention. First and second sensor mounting brackets 110a, 110b are coupled to a sensor in the form of a load cell 200 in the depicted arrangement. Bolts 120 attach the brackets 110a and 110b respectively to the mounting surfaces of sensor 200 through mounting fixtures (not shown). The assembly 100 is longitudinally symmetrical about the central longitudinal axis 130 of the assembly. This symmetry improves sensor rejection of output errors due to one or more of: thermal changes, eccentric loading conditions and load cell material characteristics making it more accurate and cost effective. The use of identical brackets 110a and 110b reduces cost. Three mounting elements with apertures therein in each bracket 110a and 110b provide for more stable support and load effect stress with less dependence on the support and loading attachments to the brackets. Decoupling flexible elements are included in the three mounting elements of each bracket 110a and 110b to further reduce mounting stresses.

The displacement control assembly comprises a first control member 28 and a second control member 30. In the embodiment shown as in FIG. 3, the first control member 28 is in the form of a control member received in an aperture 22 of the first and second mounting brackets 10a, 10b. Due to the arrangement of the first and second mounting brackets 10a, 10b relative to each other, the control member 28 would be received in the second aperture 22b of the first bracket 10a and the first aperture 22a of the second bracket 10b.

In the embodiment shown, the control member 28 is in the form of a threaded flange bolt. The thread of the bolt engages with the thread of the second aperture 22b. The bolt 28 limits the divergence of the first and second brackets 10a, 10b relative to one another when under a load. The bolt 28 can be adjusted to vary the spacing to the first and second brackets 10a, 10b, and hence the permissible divergence when under load.

In the embodiment shown, the second control member 30 comprises a stopper. The stopper 30 is in the form of a threaded cylindrical pin which is received in the threaded aperture 24 in the side wall 16 of the second mounting bracket 10b. The stopper 30 is adapted to limit the convergence of the first and second mounting brackets 10a, 10b relative to one other when under load.

As shown in FIG. 4b, a portion of the stopper 30 in use protrudes from the threaded aperture 24 and convergence of the first and second mounting brackets 10a, 10b towards one another will result in the stopper 30 abutting with the side wall 16 of the first mounting bracket 10a thus limiting further convergence of the brackets 10a, 10b towards one another. The amount of permissible convergence will depend on the amount the stopper 30 protrudes from the threaded bore 24.

Various modifications are envisaged that are within the scope of the present invention as set forth in the appended claims. For example, the first sensor mounting bracket may be of any suitable footprint for attachment to the required sensor. For example if the sensor is of circular footprint, a first sensor mounting bracket of circular footprint would be suitable for attachment to the sensor.

A pair of identical sensor mounting brackets are coupled together to form a longitudinally symmetrical sensor mounting bracket assembly according to a first aspect of the invention. The symmetrical sensor mounting bracket assembly is coupleable to a symmetrical sensor at its mounting surfaces to provide identical brackets for mounting a sensor with symmetrical provisions for attachment to both a supporting structure and a loading fixture. The supporting structure is mounted to the sensor on the same side as the loading fixture mounting. In this way, symmetrical stresses from various attachment fasteners as well as from loading effects caused by eccentric load positions are cancelled out by the configuration of the sensor assembly. In this way, the various forces acting on the sensor are resolved such that the strain responsive element(s) of the sensor are sensing shear forces acting on them.

The thermal effects and end portion bending effect stresses on the attachment fixtures and sensor respectively are cancelled out by the symmetrical configuration of the sensor assembly.

The invention claimed is:

1. A symmetrical sensor mounting bracket assembly comprising:
   a first sensor mounting bracket and a second sensor mounting bracket combined together, one above the other in parallel orientation; and
   at least one sensor attachment fixture configured to facilitate attachment of one of the first sensor mounting bracket or second sensor mounting bracket to a sensor mounting fixture separate from the first sensor mounting bracket and the second sensor mounting bracket and at least one mounting element configured to facilitate attachment of the one bracket to a load bearing plate or a sensor support structure separate from the first sensor mounting bracket and the second sensor mounting bracket.

2. A mounting bracket assembly according to claim 1 further comprising a displacement control assembly adapted to limit the deflection of a sensor coupled to the bracket assembly.

3. A mounting bracket assembly according to claim 1 wherein said first sensor mounting bracket and said second sensor mounting bracket are identical.

4. A mounting bracket assembly according to claim 1 wherein each bracket comprises a base portion and at least one side wall upstanding from the edge of the base portion.

5. A mounting bracket assembly according to claim 4 wherein the at least one sensor attachment fixture is located on the base portion.

6. A mounting bracket assembly according to claim 2 wherein the displacement control assembly comprises a first control member adapted to limit the divergence of the first and second brackets relative to one another when under a load.

7. A mounting bracket assembly according to claim 6 wherein the attachment fastener is one of a bolt or a screw.

8. A mounting bracket assembly according to claim 6 wherein the first and second brackets each comprise an aperture, at least one having a threaded bore for receiving the first control member.

9. A mounting bracket assembly according to claim 1 wherein the displacement control assembly comprises a second control member adapted to limit the convergence of the first and second brackets relative to one another when under a load.

10. A mounting bracket assembly according to claim 9 wherein the second control member comprises a stopper.

11. A mounting bracket assembly according to claim 10 wherein the stopper is in the form of a threaded cylindrical pin.

12. A mounting bracket assembly according to claim 1 wherein the first bracket comprises a rectangular footprint.

13. A mounting bracket assembly according to claim 12 wherein the first bracket comprises a rectangular base portion and four side walls each upstanding from an edge of the rectangular base portion.

14. A mounting bracket assembly according to claim 13 wherein the base portion is formed of two base sections.

15. A mounting bracket assembly according to claim 14 wherein the first base section is a plate and the second base section is formed of an aperture.

16. A mounting bracket assembly according to claim 15 wherein one half of the base portion forms the first base section and is located between the transverse midline of the first bracket and the side wall at one end of the first bracket and the other half of the base portion forms the second base section and is located between the transverse midline of the first bracket and the side wall at the other end of the first bracket.

17. A mounting bracket assembly according to claim 16 wherein the first base section is recessed below the plane including the lower surfaces of each of the side walls of the first bracket.

18. A mounting bracket assembly according to claim 1 wherein the first bracket comprises a least one sensor attachment fixture.

19. A mounting bracket assembly according to claim 18 wherein the first bracket comprises an even number of sensor attachment fixtures.

20. A mounting bracket assembly according to claim 18, wherein the attachment fixtures are positioned on the first base section.

21. A mounting bracket assembly according to claim 20 wherein the attachment fixtures are located on the lowermost planar portion of the first base section.

22. A mounting bracket assembly according to claim 1 wherein the sensor mounting bracket assembly comprises at least one mounting element configured to facilitate attachment of the bracket assembly to a load bearing plate or a sensor support structure.

23. A mounting bracket assembly according to claim 22 wherein the bracket assembly comprises a plurality of mounting elements.

24. A mounting bracket assembly according to claim 23 wherein at least one of the plurality of mounting elements is located on the first mounting bracket.

25. A mounting bracket assembly according to claim 23 wherein at least one of the plurality of mounting elements is located on the second mounting bracket.

26. A mounting bracket assembly according to claim 22, wherein the, or each, mounting element extends outwardly from the, or each, side wall of the bracket.

27. A mounting bracket assembly according to claim 26, wherein the first bracket comprises three mounting elements.

28. A mounting bracket assembly according to claim 27 wherein the first bracket comprises three mounting elements extending outwardly from three side walls of the first bracket.

29. A mounting bracket assembly according to claim 28, wherein two of the mounting elements extend outwardly from opposing side walls and the third mounting element extends outwardly of the side wall located at the end of the bracket adjacent the second base section.

30. A mounting bracket assembly according to claim 22 wherein the first bracket is longitudinally symmetrical about a central longitudinal axis of the first bracket.

31. A mounting bracket assembly according to claim 1 wherein the, or each, mounting element comprises an aperture.

32. A mounting bracket assembly according to claim 22 wherein the, or each, mounting element comprises a flexible decoupling element.

33. A mounting bracket assembly according to claim 32 wherein the, or each, flexible decoupling element is/are operable to further reduce mounting stresses when the first bracket is mounted to a load bearing plate or a load cell support structure.

34. A mounting bracket assembly according to claim 1 wherein the bracket assembly is attachable to a sensor in the form of a load cell.

35. A mounting bracket assembly according to claim 34 wherein the load cell is symmetrical about a central vertical axis.

36. A sensor assembly comprising a sensor symmetrical about a central vertical axis and comprising first and second mounting surfaces each on the same horizontal plane; and a mounting bracket assembly according to claim 1.

37. A weigh scale comprising a sensor coupled to a mounting bracket assembly according to claim 1 and further comprising a load bearing structure coupled to the mounting elements of the first and second sensor mounting brackets.

* * * * *